(12) United States Patent
Koduvayur Viswanathan (10) Patent No.: US 10,235,711 B1
(45) Date of Patent: Mar. 19, 2019

(54) DETERMINING A PACKAGE QUANTITY

(71) Applicant: Amazon Technologies, Inc., Reno, NV (US)

(72) Inventor: Krishnamurthy Koduvayur Viswanathan, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1316 days.

(21) Appl. No.: 14/177,149

(22) Filed: Feb. 10, 2014

(51) Int. Cl.
*G06Q 30/00* (2012.01)
*G06Q 30/06* (2012.01)
*G06F 17/30* (2006.01)

(52) U.S. Cl.
CPC ... *G06Q 30/0641* (2013.01); *G06F 17/30861* (2013.01); *G06F 17/30864* (2013.01); *G06Q 30/0623* (2013.01)

(58) Field of Classification Search
CPC ............ G06Q 30/0641; G06Q 30/0623; G06F 17/30864; G06F 17/30861
USPC .............................................. 705/26.1–27.2
See application file for complete search history.

(56) References Cited

U.S. PATENT DOCUMENTS

| 8,370,280 B1 * | 2/2013 | Lin ...................... G06N 99/005 706/12 |
| 2007/0282872 A1 * | 12/2007 | Probst ................... G06F 17/241 |
| 2013/0254075 A1 * | 9/2013 | Ballaro ................ G06Q 10/087 705/27.1 |

OTHER PUBLICATIONS

Leite, D. B., & Carvalho, T. D. (2011). Symbolic data analysis tools for recommendation systems. Knowledge and Information Systems, 26(3), 385-418. doi:http://dx.doi.org/10.1007/s10115-009-0282-3 (Year: 2011).*

* cited by examiner

*Primary Examiner* — William J Allen
*Assistant Examiner* — Anand R Loharikar
(74) *Attorney, Agent, or Firm* — Thorpe North & Western, LLP (57) ABSTRACT

A technology is described for determining an item package quantity. An example method may include extracting a first item package quantity from a first attribute field for a product and extracting a second item package quantity from a second attribute field for the product. The first item package quantity and the second item package quantity may then be classified using a prediction model that determines a likely correctness of the first item package quantity and the second item package quantity. An item package quantity may then be selected from the first item package quantity and second item package quantity having a classification that indicates that the item package quantity is likely correct.

14 Claims, 9 Drawing Sheets

DETERMINING A PACKAGE QUANTITY

BACKGROUND

Electronic retail stores provide customers with the ability to shop for items without having to visit a physical retail store. By way of an electronic retail store page, a customer may view images and details associated with an item available for purchase. For example, an electronic retail store page may contain images and details for an item allowing a customer to visually identify the item, read item details such as the item name, manufacturer, size, quantity, ingredients, weight, as well as any other details associated with the item that the customer may use to make a purchase decision.

Because an electronic retail store may not have a physical location where a customer may inspect and handle an item prior to purchasing, an electronic retail store may gather item information and display the item information in an electronic retail store page. For example, a database may contain a number of fields containing various information fields for an item. Such fields may include an item name field, a bullet point field, an item quantity field and the like. When an electronic retail store page for an item is retrieved, information about the item may be retrieved from the database and displayed within the electronic retail page. A customer may use the item information retrieved from the database to make a purchase decision. In some cases, item information included in various database fields may be unclear or less accurate and may hamper the ability of a customer to search for items or make a purchase decision based on the item information provided.

DETAILED DESCRIPTION

A technology is described for determining an item package quantity for an item that may be purchased from an electronic retail store. In one example, an item may be a retail package containing multiple product items (e.g., a box of pencils). In another example, an item may be a bulk type package containing multiple packages of a product (e.g., a bulk package of bath tissue containing multiple boxes of bath tissue).

In one example, an item package quantity for an item may be extracted from various attribute fields (e.g., database fields) associated with the item. An attribute field may contain unstructured text, such as an item name description, an item bullet point description, a number of items value, an item package quantity value, etc. In some cases, an attribute field may contain incorrect quantity information or may be blank. As a result, in one example, at least two attribute fields may be used to determine an item package quantity by extracting an item package quantity from each of the two attribute fields and determining a likely correctness of the item package quantities. For example, a first item package quantity may be extracted from a first attribute field and a second item package quantity may be extracted from a second attribute field. The first item package quantity and the second item package quantity may then be classified using a prediction model to determine the correctness of the first item package quantity and the second item package quantity. An item package quantity may then be selected from the first item package quantity and second item package quantity that has a classification that indicates that the item package quantity is correct.

In another example configuration, after determining an item package quantity using the example method above, item package quantities within a classification node (e.g., a grouping of similar items) may be further refined by grouping item package quantities within the classification node and creating a package quantity set from the grouping of item package quantities. Outlier item package quantities within the package quantity set may then be determined and the outliers may then be removed from the package quantity set. An inverted index of items (i.e., an index where items are indexed by an item package quantity) may be constructed and the inverted index may be used by a filtering tool for a search engine that allows a customer to filter items on an electronic retail page based on item package quantity. For example, a number of package item quantities (e.g., 6, 12, 18 and 24) may be displayed on an electronic retail page allowing a customer to filter items by selecting an item package quantity, whereupon items containing the item package quantity selected may be displayed.

Figure 1:
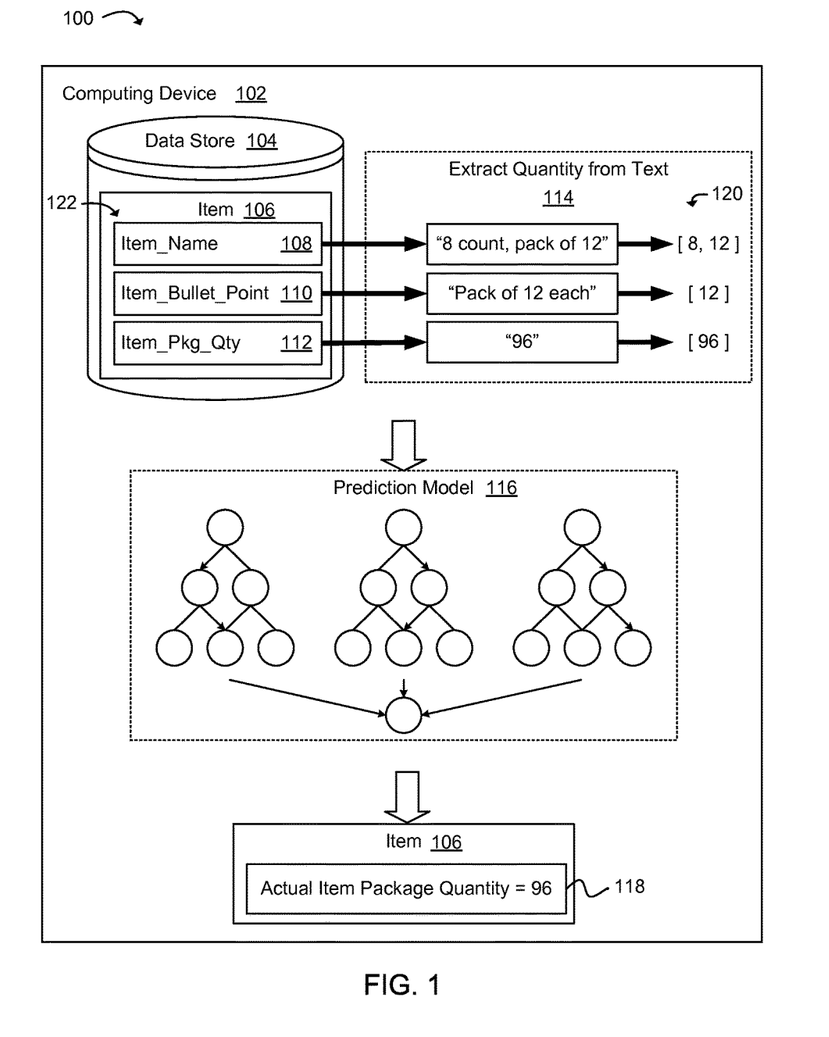
FIG. 1 is a diagram illustrating an example system and method for determining an item package quantity for an item.

FIG. 1 is a diagram illustrating a high level example of a system and method 100 for determining an item package quantity for an item. The system may include a computing device 102 having one or more data stores 104. In one example, a data store 104 may contain an item catalog for an electronic retail store. The product catalog may include a number of items 106 that may be available for purchase from the electronic retail store. Items sold by the electronic retail store may include various categories of items. For example, categories of items may include clothing, electronics, housewares, hardware, groceries, health and beauty, etc. Items within an item category may be packaged such that a package may contain multiple items. As a specific example, a package of paperclips may contain one hundred paperclips. A bulk package of paperclips may contain ten packages of paperclips where each package of paperclips contains one hundred paperclips. As a result, the bulk package of paperclips may contain a total of one thousand paperclips.

An item 106 may be associated with a number of item attributes that provide information about the item 106. For example, an item attribute may provide a description of an item, such as an item name, a description of the item, a quantity of item products included in the item package, the weight of the item, etc. An item attribute may be stored in an attribute field within the data store 104. In one specific example, an item 106 may be associated with an item name attribute and an item bullet point attribute. The item name attribute may be stored in an item_name field 108 and the item bullet point attribute may be stored in an item bullet point field 110. The attribute information input into the item_name field 108 and the item bullet point field 110 may, in one example, be unstructured text. The unstructured text may contain multiple facets of item information. As a specific example, the item_name field 108 may contain an item brand name, an item description and an item package quantity (e.g., "Brand A Pastry Tarts, Brown Sugar Cinnamon, 8-Count Tarts (Pack of 12)").

As an example, attribute fields 122 may be examined to determine whether an attribute field 122 includes an item package quantity for the item 106. For example, an attribute field may be retrieved from the data store 104 for an item 106 and the field's unstructured text may be parsed to determine whether the unstructured text contains an item package quantity. As described in greater detail in relation to FIG. 4, unstructured text can be tokenized and n-grams (e.g., bigrams and trigrams) may be constructed from the tokenized text. As an illustration, the item_name field 108 may be retrieved from the data store 104 and the text contained in the item_name field 108 may be parsed and, if found, an item package quantity may be extracted from the text 114. As an example, the text of the item_name field 108 may be "Brand A Pastry Tarts 8-Count, (Pack of 12)". The text may be parsed to identify terms that are associated with a quantity. For instance, the example text above contains the terms "Count" and "Pack of", which may be terms associated with an item package quantity. Therefore the terms and associated numerical values may be extracted from the text (i.e., "8-Count" and "Pack of 12"). The numerical values, 8 and 12, of the extracted text may represent quantities for the item 106 that, when multiplied together, generate an item package quantity as described later below.

In one example configuration, in order to determine a likely correctness of an item package quantity extracted from an item attribute, at least one additional attribute field 122 may be retrieved from the data store 104 and a second item package quantity may be extracted from the unstructured text and compared to a first item package quantity. Differences between the first item package quantity and the second item package quantity may then be reconciled. As a specific example, item package quantities may be extracted from the unstructured text contained in an item name field 108 and the unstructured text contained in an item_bullet_point field 110. The item package quantities may then be compared. Differences between the item package quantity extracted from the item_name field 108 and the item package quantity extracted from the item_bullet_point field 110 may be reconciled by providing the item package quantities 120 to a prediction model 116.

In one example configuration, the prediction model 116 may be a supervised machine learning model that may be used to predict which of the item package quantities 120 is likely correct. Examples of supervised machine leaning models that may be used to predict a likely correct item package quantity may include, but are not limited to, a random forest model, a Bayesian network model, a linear classifier model, a neural network, a support vector machine or any variant of a supervised machine leaning model. In one example, a feature vector may be constructed using the item package quantities 120 extracted from the attribute fields 122 (e.g., the item_name field 108, the item_bullet_point field 110 and the item_pkg_qty field 112) and the feature vector may then be provided to the prediction model 116. It should be noted that the attribute fields 122 enumerated in this disclosure and in FIG. 1 are merely examples and that any attribute field associated with an item 106 containing an item package quantity may be used.

A feature vector may represent an item 106 that has conflicting item package quantity information in the different attribute fields 122 associated with the item 106. For example, the item_name field 108 and the item_bullet_point field 110 for an item 106 may contain conflicting item package quantities. As a specific example, the item package quantities "8" and "12" may have been extracted from the item_name field 108, and the item package quantity of "12" may have been extracted from the item_bullet_point field 110. As a result, the item package quantity of "8" extracted from the item_name field 108 is a conflicting item package quantity between the item_name field 108 and the item_bullet_point field 110.

A majority of features in a feature vector may represent inter-item attribute agreements regarding item package quantities (e.g., the item package quantity of 12 found in both the item_name field 108 and the item_bullet_point field 110). The features in the feature vector may indicate whether the item package quantity in one item attribute is present in some form in another item attribute. In a case where multiple item attributes provide the same item package quantity, the existence of the same item package quantity in the multiple item attributes may be a good indicator that the item package quantity is correct. As a specific example, where a first item attribute contains an item package quantity of "96" and a second item attribute contains the same item package quantity of "96", the item package quantity contained in the first item attribute is more likely to be correct.

Further, one or more features of the feature vector may indicate that the actual item package quantity may be derived from multiple item package quantities extracted from a single item attribute (e.g., 8 Count, Pack of 12). Namely, the product of the multiple item package quantities may be the actual item package quantity for the item 106. As a specific example, FIG. 1 illustrates an item 106 having an item attribute (i.e., the item_name field 108) that contains an item package quantity of "8" and an item package quantity of "12". A feature vector constructed for the item 106 may include a feature that indicates that the actual item package quantity for the item 106 may be the product of the item package quantities "8" and "12" extracted from the item_name field 108. Thus, the actual item package quantity for the item 106 may be "96".

The following table provides an example feature vector based on the item 106 and associated attribute fields 122 (i.e., item_name field 108, item_bullet_point field 110 and item_pkg_qty field 112) illustrated in FIG. 1.

| Feature Name | Description | Type |
|---|---|---|
| item_name_qtys_type bullet_point_qtys_type ipq_qty_type | Features indicate a type of value present in the attributes item_name, item_bullet_point, item_pkg_qty. | {Singular, Plural, Missing} |

| Feature Name | Description | Type |
|---|---|---|
| confidence_item_name_qtys confidence_bullet_point_qtys | Features indicate confidence in the item package quantities extracted from the attributes item_name and item_bullet_point. | {0, 1} |
| num_unique_qtys_in_item_name num_unique_qtys_in_bullet_point | Features indicate the number of unique quantities present in attributes item_name and item_bullet_point. | {0, 1, 2, 3 or more} |
| item_name_identical_bullet_point | Feature indicates whether the item package quantities in the item_name attribute are identical to the quantities in the item_bullet_point attribute. | {True, False} |
| item_name_intersection_bullet_point | Feature indicates whether an intersection exists between the item package quantities in the attributes item_name and item_bullet_point. | {True, False} |
| identical_item_name intersection_item_name | Features indicate a similar comparison between attributes item_name and item_pkg_qty. | {True, False} |
| identical_bullet_point intersection_bullet_point | Features indicate a similar comparison between item_bullet_point and item_pkg_qty | {True, False} |
| item_name_product | Feature indicates that the product of item package quantities present in the item_name attribute is equal to the item package quantity in the item_pkg_qty attribute. | {True, False} |
| bullet_point_product | Feature indicates that the product of item package quantities present in the item_bullet_point attribute is equal to the item package quantity in the item_pkg_qty attribute. | {True, False} |

The prediction model 116 may classify the features of the feature vector, such that a likely correct item package quantity may be determined for the item 106 based on the classification. For example, the prediction model 116 may classify the feature vector into one of a number of predicted labels. The predicted labels may represent an outcome of whether an item attribute contains a correct item package quantity. As an illustration, the following example prediction labels are based on the item 106 and associated attribute fields 122 (i.e., item name field 108, item_bullet_point field 110 and item_pkg_qty field 112) as illustrated in FIG. 1.

| Example Predicted Labels |
|---|
| (1) The correct item package quantity is as indicated in the item_name attribute. |
| (2) The correct item package quantity can be generated by multiplying two quantities in the item_name attribute. |
| (3) The correct item package quantity is as indicated in the item_bullet_point attribute. |
| (4) The correct item package quantity can be generated by multiplying two quantities in the item_bullet_point attribute. |
| (5) The correct item package quantity is as indicated in the item_pkg_qty attribute. |
| (6) The correct item package quantity cannot be determined. |

As a specific example, based on the example predicted labels above and the attribute fields 122 illustrated in FIG. 1, the prediction model 116 may classify a feature vector for the item 106 to a label (i.e., label 2 above) that indicates that the likely actual item package quantity 118 can be generated by multiplying the two quantities in the item_name field 108. It should be noted that in some cases, more than one predicted label may be applicable to a feature vector (i.e., more than one attribute field 122 contains the actual item package quantity 118). These cases may arise when the actual item package quantity 118 may be contained in two or more attribute fields 122. As an illustration, both the item_name field 108 and item_pkg_qty field 112 may contain the actual item package quantity once the product of the item package quantities in the item_name field 108 is produced. In such a case, a multi-label classifier may be used, for example, which may be constructed using binary classifiers. Each binary classifier may be used to predict a label for a feature vector. As such, if the correct item package quantity for an item is present in two or more attribute fields 122, then the attribute fields 122 (e.g., item_name field 108 and item_pkg_qty field 112) may be labeled as containing the actual item package quantity 118.

Figure 2:
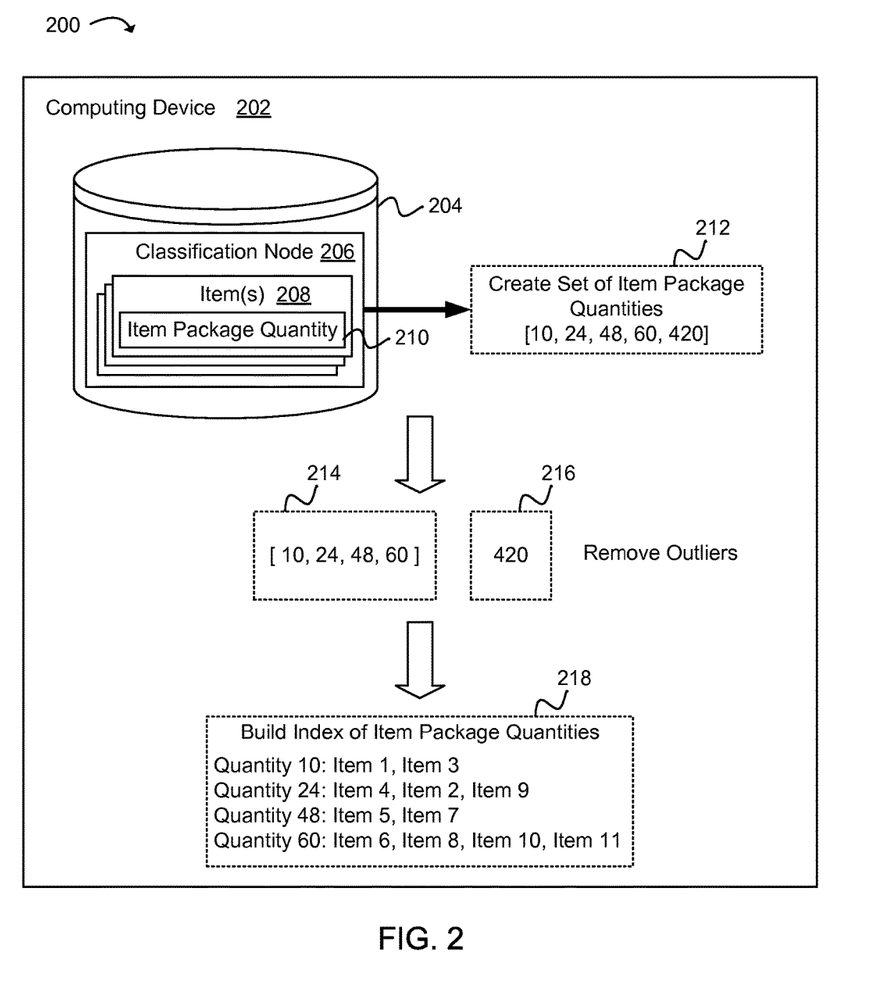
FIG. 2 is a diagram illustrating an example system and method for refining the accuracy of item package quantities within a classification node.

FIG. 2 illustrates an example system and method 200 for refining item package quantities 210 within a classification node 206 containing classified items that enable a user to browse items by hierarchical classifications. Refining item package quantities 210 within a classification node 206 and providing the item package quantities 210 to a customer via an electronic store page may allow the customer to narrow search results for an item 208 (e.g., product) by selecting an item package quantity 210 displayed in a navigation pane. A classification node 206, in one example, may be a grouping of similar items 208. For example, an item 208 may be grouped into a classification node 206 and sub-classification nodes based on one or more characteristics of the item 208, thereby forming a hierarchical structure such as a browse tree. A specific example of a browse tree may be a grocery browse tree having a root that is a grocery node and branching out to a produce node, a bakery node, a processed foods node and so on.

The system may include a computing device 202 that includes a data store 204. Various data may be stored in the data store 204 that is accessible to the computing device 202. The data stored in the data store 204 may include, for example, classification nodes 206 having items 208 that may be associated with an item package quantity 210. The computing device 202 may execute a method to group item package quantities 210 for items 208 within a classification node 206, and to identify and remove outlier item package quantities from the classification node 206. In one example configuration, a set of item package quantities 212 contained within a classification node 206 may be retrieved from the data store 204. When retrieving the set of item package quantities 212 from the data store 204, a grouping function may be performed that groups items 208 having identical item package quantities together.

The set of item package quantities 212 may be analyzed to determine item package quantities that may be outliers. An outlier filtering method may be used to identify outlier item package quantities within the set of item package quantities 212. In one example, a discordancy test may be used to identify outliers. In another example, the sequential exception method may be used to identify outlier item package quantities that may have a value that is outside of a defined distance from the values of other item package quantities within the set of item package quantities 212. As a result, a subset of item package quantities 216 may be eliminated from the set of item package quantities 212 that contributes to a dissimilarity in the set of item package quantities 212. Essentially, the subset of item package quantities 216 whose removal from the set of item package quantities 212 results in a reduction in a variance of the residual set of item package quantities 214. A detailed example of one method to remove outliers from a set of item package quantities 212 is provided later in relation to FIG. 6.

In one example configuration, a set of item package quantities 212 may be refined (i.e., by removing outliers) using various heuristics. In one example, item package quantities 210 that may be associated with a small number of items 208 in a classification node 206 may be removed from a set of item package quantities 212. As an illustration, given the set of item package quantities [10, 24, 48, 60, 420], the item package quantities "10", "24", "48" and "60" may be associated with ten or more items 208, whereas the item package quantity "420" may be associated with one item. Because the item package quantity "420" is associated with only one item, the subset of item package quantities 216 containing the item package quantity "420" may be removed from the set of item package quantities 212 resulting in a residual set of item package quantities 214.

In another example configuration, item package quantities 210 associated with a defined percentage of detail page hits may be retained in a set of item package quantities 212 and item package quantities not meeting the defined percentage of detail page hits may be removed from the set of item package quantities 212. A detail page hit may be an electronic page visit by a customer where the electronic page may be a detail page for an item. For example, a detail page may contain detail information for an item, as well as information that may influence a customer's buying decision. A high percentage of detail page hits may indicate that an item associated with the detail page may be in demand among an electronic retail store's customers and therefore included in an item package quantity index that may be used to construct a filtering tool used by a customer to filter item search results.

In yet another example configuration, item package quantities 210 associated with a defined percentage of items 208 within a classification node 206 may be retained in a set of item package quantities 212 and item package quantities that do not have more than the threshold percentage of items 208 may be removed from the set of item package quantities 212. As a specific example, item package quantities associated with at least 15% of items within a classification node 206 may be retained in a set of item package quantities 212 and those item package quantities associated with less than 15% of items in the classification node 206 may be removed from the set of item package quantities 212. In a further example configuration, various heuristic methods may be combined in order to refine a set of item package quantities 212. As a specific example, the heuristic methods described above can be combined, namely, the method may include identifying item package quantities 210 associated with a certain percentage of detail page hits and identifying item package quantities 210 associated with a defined percentage of items 208 within a classification node 206. As will be appreciated, the technology is not limited to the preceding examples, various other methods may be used to refine a set of item package quantities and these methods are considered within the scope of this disclosure.

An index may be constructed that may be used to identify items 208 associated with a particular item package quantity 210. In one example configuration, an inverted index 218 may be constructed that maps an indexed item package quantity to a number of items 208 within a classification node 206. The inverted index 218 may then be made available to a customer via a filtering tool included in an electronic retail page that allows the customer to filter search results for an item by selecting an indexed item package quantity. As an illustration, a customer searching for a package of granola bars may further filter the search by selecting an item package quantity desired (e.g., 24) from the filter tool (e.g., listing 10, 24, 48 and 60 as item package quantity selections), upon which the customer may be presented with packages of granola bars available for purchase that contain a package quantity selected (e.g., 24).

Figure 3:
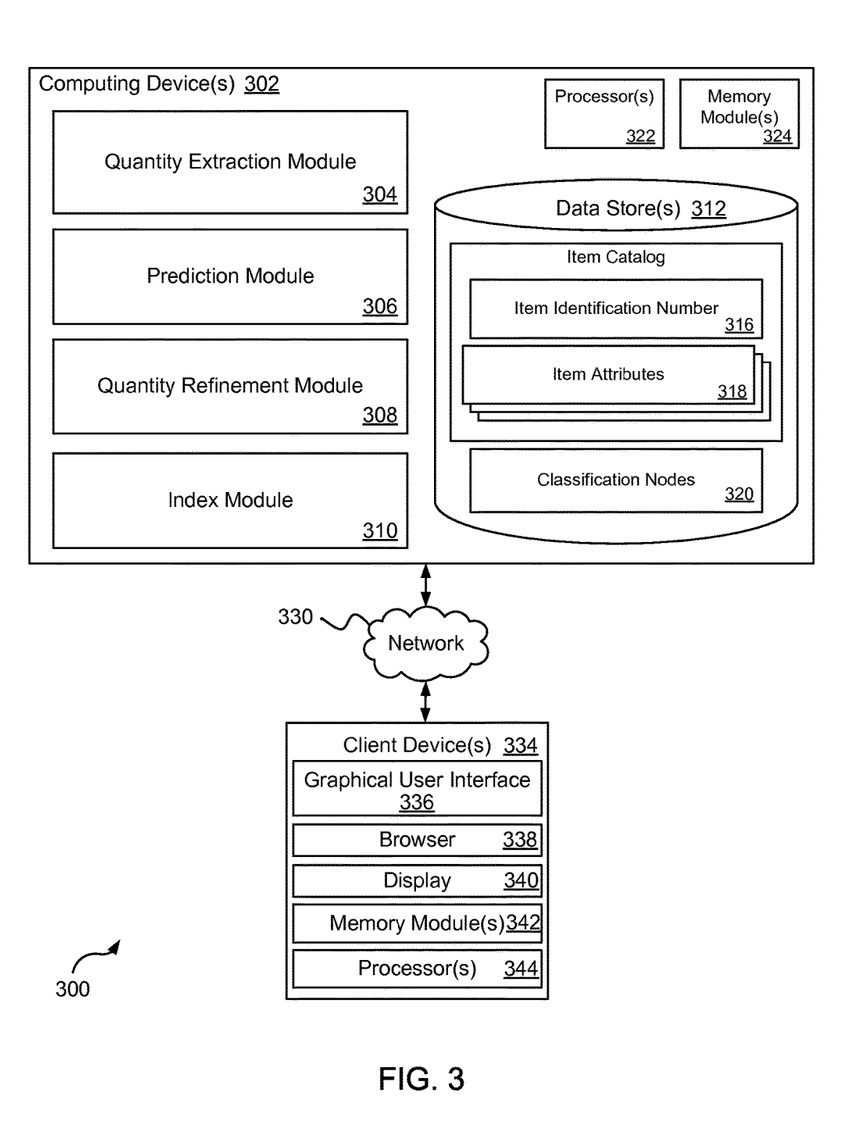
FIG. 3 is a block diagram that illustrates an example system for determining an item package quantity for an item and further refining the accuracy of item package quantities within an associated classification node.

FIG. 3 illustrates an example of various components of a system 300 on which the present technology may be executed. In one example configuration, the system may include a computing device 302 that may be in communication with a client device 334 by way of a network 330. The computing device 302 may contain a data store 312 that is accessible to the computing device 302. Various data may be stored in the data store 312, including, item identification numbers 316 where an item identification number 316 may be associated with an item available for purchase from an electronic retail store. Data associated with each item identification number 316 may be a number of item attributes 318. The computing device may also contain a number of modules that may be used to perform the operations for the technology. The modules may include a quantity extraction module 304, a prediction module 306, a quantity refinement module 308, an index module 310 as well as other services, processes, systems, engines, or functionality not discussed in detail herein.

The quantity extraction module 304 may be configured to retrieve a number of item attributes 318 from the data store 312 and extract an item package quantity from unstructured text contained in an item attribute 318. Item attributes 318 that may contain an item package quantity include attributes that describe an item, such as an item name attribute, an item bullet point attribute, and item package quantity attribute, a number of items attribute, etc. As a specific example, an item name attribute may contain unstructured text that includes an item package quantity within the unstructured text. As in a previous example, the unstructured text for the item name attribute may include "Brand Q Granola Bars, Variety Pack, 8 Chocolate Chip, 8 Chocolate Brownie and 8 Honey Graham, Pack of 24". In one example configuration, the quantity extraction module 304 may be configured to parse the unstructured text, thereby tokenizing the unstructured text and constructing n-grams (e.g., bigrams and trigrams) from the tokenized text. The n-grams may then be filtered using a set of patterns. The patterns may be used to identify n-grams associated with item package quantities. For example, patterns such as "box of n", "pack of n", "n count", "n count boxes" and the like. After identifying candidate n-grams, the quantities associated with the n-grams are then extracted. Thus, as a specific example, the quantity "3" would be extracted from the trigram "box of 3".

The prediction module 306 may be configured to classify item package quantities extracted from a number of item attributes 318 associated with an item identification number 316. Classification of an item package quantity may be performed using a prediction model that classifies the item package quantities. Based on a classification that indicates that an item package quantity is likely correct, an item package quantity may be selected. As an illustration, item attributes 318 and the item package quantities extracted from the item attributes 318 may be used to construct a feature vector. The feature vector may then be classified into a prediction label using a prediction model that outputs the prediction label. For example, the prediction label may indicate which of the item attributes 318 contains an item package quantity that is likely correct, or the prediction label may indicate that the correct item package quantity cannot be determined.

Using the quantity refinement module 308, a set of item package quantities derived for a classification node 320 may be refined by removing item package quantities that may be determined to be outlier item package quantities. Various methods may be used by the quantity refinement module 308 to identify outlier item package quantities within a set of item package quantities. Examples of methods that may be used to detect outlier item package quantities are discussed below in relation to FIG. 6.

The index module 310 may be configured to construct an item package quantity index that may be used to filter an item search performed by a customer. In one example configuration, an inverted index may be constructed. The inverted index may include item package quantities that identify item identification numbers 316 associated with a particular item package quantity. For example, an item package quantity may be associated with a number of item identification numbers 316 representing items having the item package quantity. As an illustration, a number of item identification numbers 316 associated with a number of boxes of toaster pastries containing 8 pastries per box may be indexed using an item package quantity of the same number (i.e., 8). In one use example, a filter tool may be included in an electronic retail store page that allows a customer to filter an item search based on an item package quantity. The filter tool may reference the inverted index to identify item identification number 316 associated with the item package quantity selected, and items associated with the item identification number 316 may then be displayed to a customer.

A client device 334 may include any device that may be capable of sending and receiving data over a network 330. A client device 334 may comprise, for example a processor-based system such as a computing device. Such a computing device may contain one or more processors 344, one or more memory modules 342 and a graphical user interface 336. A client device 334 may be a device such as, but not limited to, a desktop computer, laptop or notebook computer, tablet computer, handheld computer, smart phone, or other devices with like capability. The client device 334 may include a browser 338 that may enable the client device 334 to connect to an electronic retail store. The client device 334 may include a display 340, such as a liquid crystal display (LCD) screen, gas plasma-based flat panel display, LCD projector, cathode ray tube (CRT), or other types of display devices, etc.

The various processes and/or other functionality contained on the computing device 302 may be executed on one or more processors 322 that are in communication with one or more memory modules 324 according to various examples. The computing device 302 may be comprised, for example, of a server or any other system providing computing capability. Alternatively, a number of computing devices 302 may be employed that are arranged, for example, in one or more server banks or computer banks or other arrangements. For purposes of convenience, the computing device 302 is referred to in the singular. However, it is understood that a plurality of computing devices 302 may be employed in the various arrangements as described above.

The term "data store" as used herein may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 312 may include storage systems such as a SAN (Storage Area Network), cloud storage network, volatile or non-volatile RAM, optical media, or hard-drive type media. The data store 312 may be representative of a plurality of data stores 312 as can be appreciated.

The network 330 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 3 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An application program interface (API) may be provided for each module to enable a second module to send requests to and receive output from the first module. Such APIs may also allow third parties to interface with the module and make requests and receive output from the modules. While FIG. 3 illustrates an example of a system that may implement the techniques above, many other similar or different environments are possible. The example environments discussed and illustrated above are merely representative and not limiting.

Figure 4:
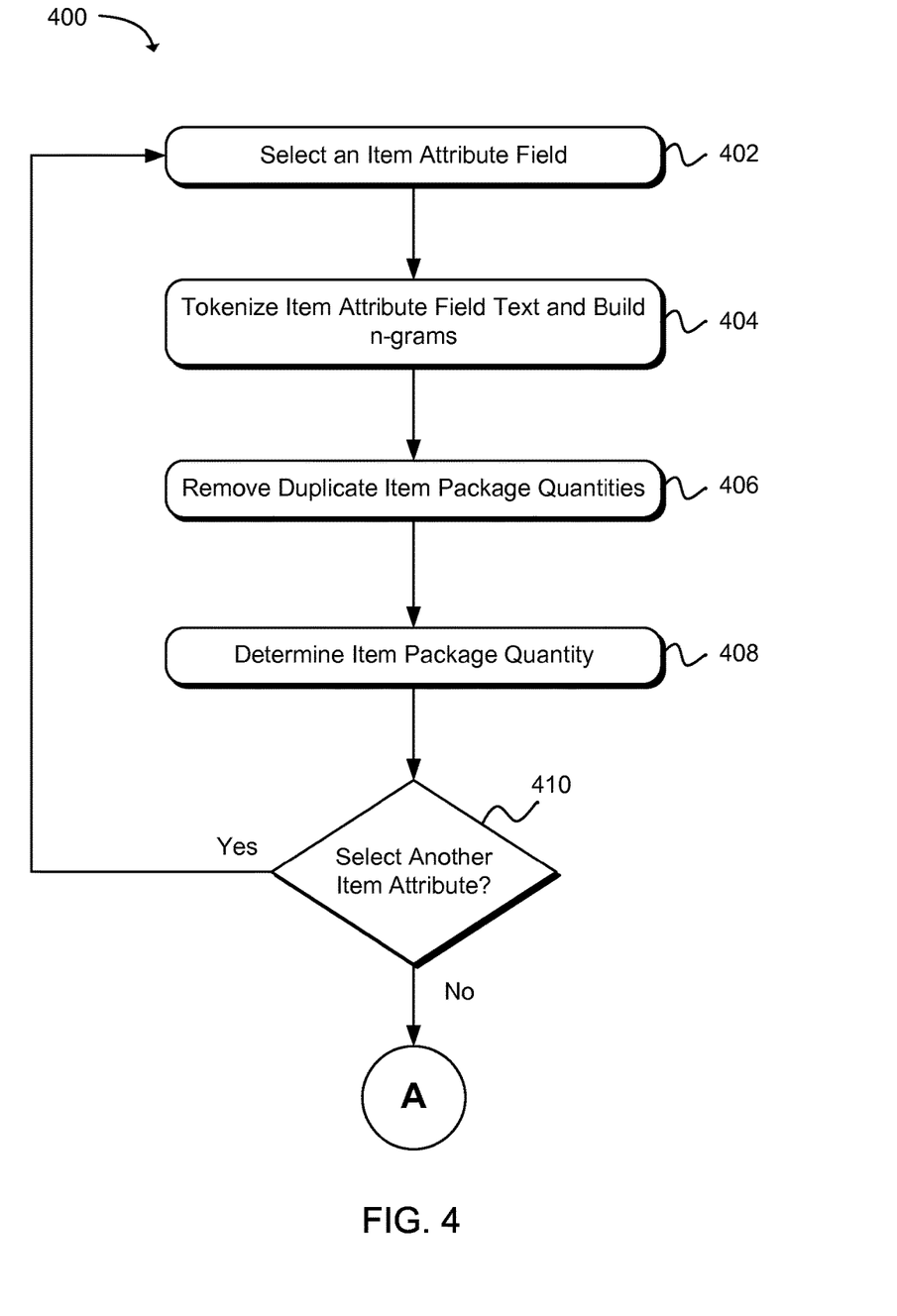
FIG. 4 is a flow diagram illustrating an example method for extracting an item package quantity from unstructured text contained in an item attribute field.

Moving now to FIG. 4, a flow diagram illustrates one example method 400 for extracting an item package quantity from the unstructured text of an attribute field. As in block 402, an attribute field associated with an item may be selected. The attribute field selected may be an attribute that may be known to contain an item package quantity. For example, an attribute field's name may be an indicator that the attribute field contains an item package quantity (e.g., attribute fields named item_package_quantity or number_of_items). Also, analysis (i.e., machine and/or human) may be performed for the different attribute fields of an item to identify which attribute fields may contain an item package quantity.

As in block 404, the unstructured text of the selected attribute field may be tokenized (e.g., separating the unstructured text into words, phrases, symbols, etc.) and the tokenized text may then be used to build n-grams (e.g., bigrams and/or trigrams). The resulting n-grams may then be filtered using a set of patterns to identify n-grams that may be associated with an item package quantity. Examples of patterns may include "box of n", "quantity of n", "count of n", "n each", etc. In one example configuration, patterns used to filter n-grams may be human curated. As an illustration of building n-grams, an item name field may contain the unstructured text "Bar Soap 4 ounce bars (box of 3 each)". The unstructured text may be tokenized and the set of n-grams "4 ounce", "box of 3" and "3 each" may be constructed from the tokenized text. The set of n-grams may then be filtered using a set of patterns that may be used to identify the following item package quantity n-gram candidates "box of 3" and "3 each".

A set of n-grams may be analyzed to identify n-grams that may contain duplicate quantities within the n-gram set. For example, the n-grams "box of 3" and "3 each" both contain the quantity "3". As in block 406, an n-gram containing a duplicate quantity may be removed from the n-gram set. For example, the n-gram "box of 3" may be removed from the n-gram set "box of 3" and "3 each". As in block 408, the quantity or quantities remaining in the n-gram set may be determined and associated with the attribute field from which the quantity, or quantities were extracted. For example, in the remaining n-gram set "3 each", the quantity "3" may be determined to be the item package quantity associated with an attribute field. In another example, in a remaining n-gram set "8 count" and "pack of 12", the quantities "8" and "12" may be determined to be item package quantities associated with an attribute field.

Having determined an item package quantity for a selected attribute field, the item package quantity may be associated with the attribute field, and, as in block 410, another attribute field may be selected. In a case where a second attribute field is selected, the item package quantity extracted from the second attribute field may be compared to an item package quantity extracted from a first attribute field in order to determine a likely correctness of the item package quantities.

Figure 5:
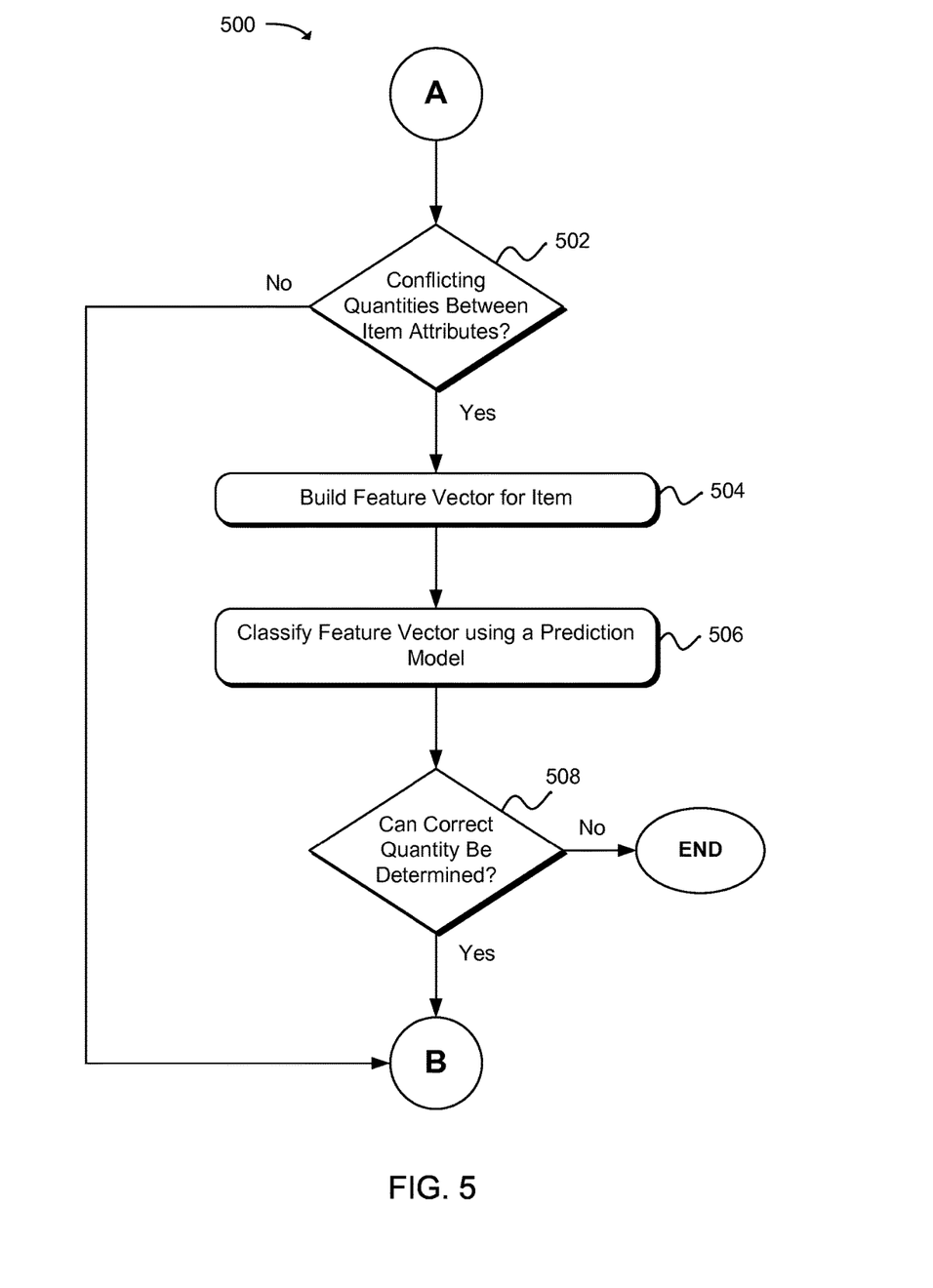
FIG. 5 is a flow diagram that illustrates an example method for determining whether an item package quantity is likely accurate.

FIG. 5 is a flow diagram illustrating one example method 500 for determining whether an item package quantity is likely accurate. Beginning in block 502, item package quantities associated with a number of attribute fields may be compared to determine whether a conflict exists between the item package quantities. For example, a first item quantity for a first attribute field may not be equal to a second item quantity for a second attribute field. As a specific example, a first item package quantity extracted from a first attribute field may be "8" and "12", and a second item package quantity extracted from a second first attribute field may be "96". Because the first item package quantity and the second item package quantity are not equal, an attempt may be made to resolve the conflict between the two item package quantities.

In a case where a conflict between item package quantities may exist, as in block 504, a feature vector may be constructed for an item associated with the item package quantities. As described earlier, a feature vector may represent an item that has conflicting item package quantity information in two or more attribute fields associated with the item. The features of the feature vector may indicate whether an item package quantity contained in a first attribute field may be present in a second attribute field. The form of an item package quantity in a first attribute field may be different than a form of the item package quantity in a second attribute field. As an example, an item package quantity may be a single quantity (e.g., 96), or may be multiple quantities used to produce a product (e.g., "9" and "12" may be multiplied to produce an item package quantity of "96").

A feature vector constructed for an item may be provided to a prediction model. As in block 506, the prediction model may classify the feature vector into one of a number of labels that indicates the likely correctness of an item package quantity associated with an attribute field, as described earlier. In one example configuration, the prediction model may be a supervised machine learning model that predicts a defined label whether the item package quantity may be derived from a first attribute field or a second attribute field. Such a supervised machine learning model may be a random forest model having a number of decision trees. Random features from the feature vector may be provided to the decision trees and a modal value produced by the decision trees may then be mapped to a defined label indicating whether an item package quantity contained in an attribute field is likely accurate. Alternatively, supervised machine learning models such as, but not limited to, a Bayesian network model or a linear classifier model may be used classify the feature vector.

A defined label may indicate, as in block 508, whether a likely accurate item package quantity can be determined. For example, a defined label may indicate that an attribute field contains a likely accurate item package quantity, or the defined label may indicate that the correct item package quantity cannot be determined.

Figure 6:
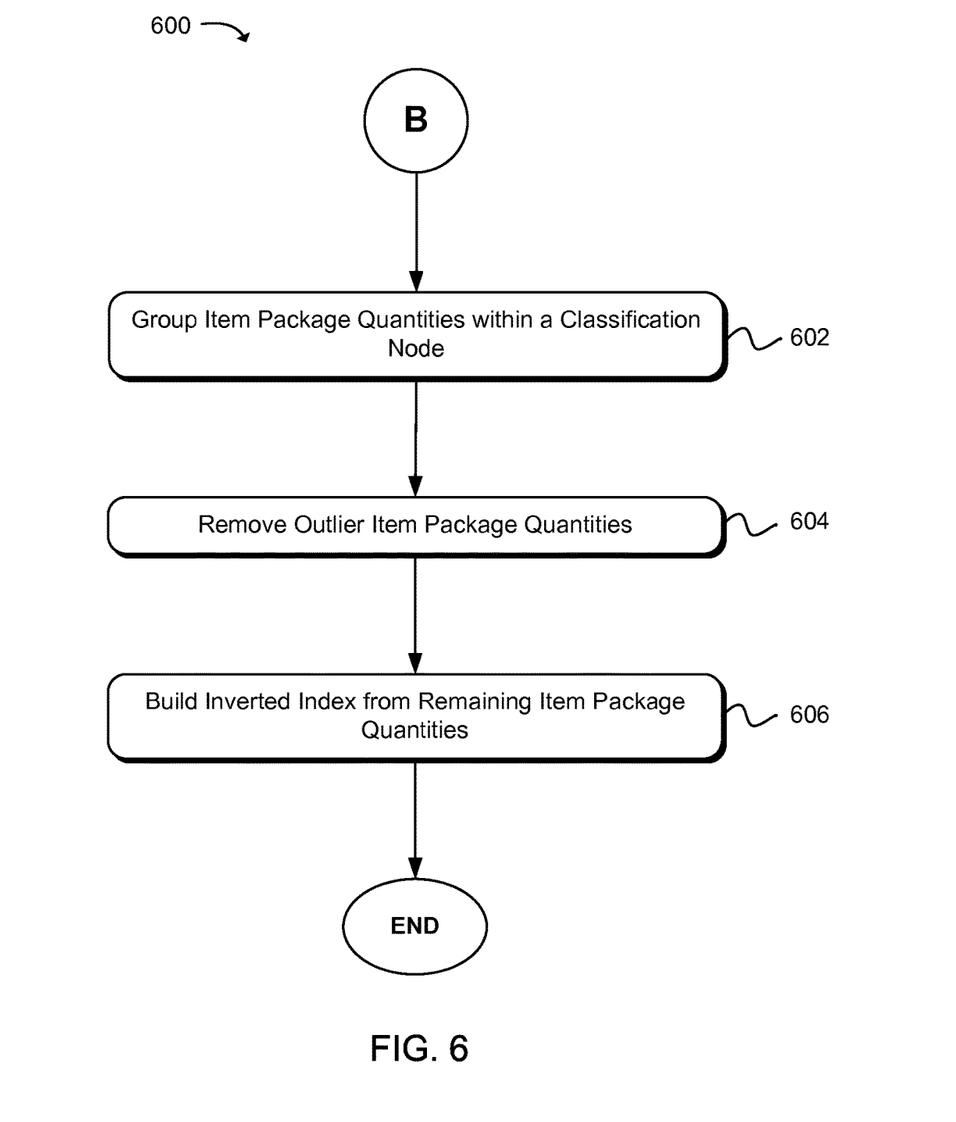
FIG. 6 is a diagram illustrating an example method for refining the accuracy of item package quantities within a classification node.

FIG. 6 is a flow diagram illustrating an example method 600 for refining a package quantity set within a classification node. In one example configuration, the processes performed above in relation to FIG. 4 and FIG. 5 may be performed for each item within a classification node. The method 600 may then be performed for a classification node in order to further refine the accuracy of the item package quantities so that the item package quantities, in one example, may be used to build a filter tool. The filter tool may allow a customer of an electronic retail store to identify packaged items containing a desired number of items.

Beginning in block 602, item package quantities within a classification node may be grouped. This group may occur using an SQL (Structured Query Language) type function, for example, and a package quantity set may then be formed using the grouping. Then, as in block 604, outlier item package quantities within the package quantity set may be identified and removed from the package quantity set. Furthermore, any outlier filtering method can be used to identify outlier item package quantities. In one example configuration, a special instance of a sequential exception method may be used to identify outlier item package quantities. The sequential exception method described in this description may be considered a special case because an optimal order for considering subsets of item package quantities may be computed. Using the sequential exception method, a subset of item package quantities may be eliminated from an input set of item package quantities that contributes most to a dissimilarity of item package quantities within the input set. Essentially, given a package quantity set, an attempt may be made to identify a subset of item package quantities whose removal may result in a reduction in variance within a residual set of item package quantities, per item package quantity removed.

As a specific example of the sequential exception method, item package quantities within an item package quantity set may be sorted based on a decreasing order of the distance from the item package quantities' mean. The item package quantities may then be discarded one by one while computing a smoothing factor of a residual set after discarding of each of the item package quantities. After which, a reduced package quantity set having the smallest smoothing factor value as compared to other smoothing factor values for other reduced package quantity sets may be selected as the output. The smoothing factor may indicate how much dissimilarity within the package quantity set can be reduced by removing a subset of item package quantities. The smoothing factor, in one example, may be defined as:

$$SF(I_j) := C(I-I_j) * (D(I) - D(I-I_j))$$

Where
I is the input set of quantities,
$I_j$ is a subset of I,
$C(I_j)$ is the cardinality of the set $I_j$,
$D(I_j)$ represents the dissimilarity of the elements in the set $I_j$, defined as the variance of the elements in the package quantity set. The variance of the decrementing subsets can be computed dynamically. The mean and variance above may refer to the population mean of the package quantity set and the population variance of the package quantity set. Because the package quantity set population is considered, no sampling is performed and no underlying distribution is assumed.

One alternative example method that may be used to identify outlier item package quantities may include identifying a base item package quantity for a class of items and removing item package quantities that are not some multiple of the base item package quantity. As a specific example, a package of toaster pastries within a classification node 320 may contain a base package quantity of eight pastries. Bulk packages of the toaster pastries may contain a package quantity that is some multiple of eight (e.g., 16, 24, 32, etc.). As a result, packages of items within the toaster pastry category node may be expected to contain eight pastries, or some multiple of eight pastries. Thus, any item package quantity within the toaster pastry category node that is not a factor of eight may be an outlier and therefore may be removed.

Using the residual package quantity set, as in block 606, an inverted index may be constructed. For example, items within the classification node having an item package quantity equal to an item package quantity within the residual set may be included in the inverted index. The inverted index may then be used to filter a customer's search results within an electronic retail store, for example.

Figure 7:
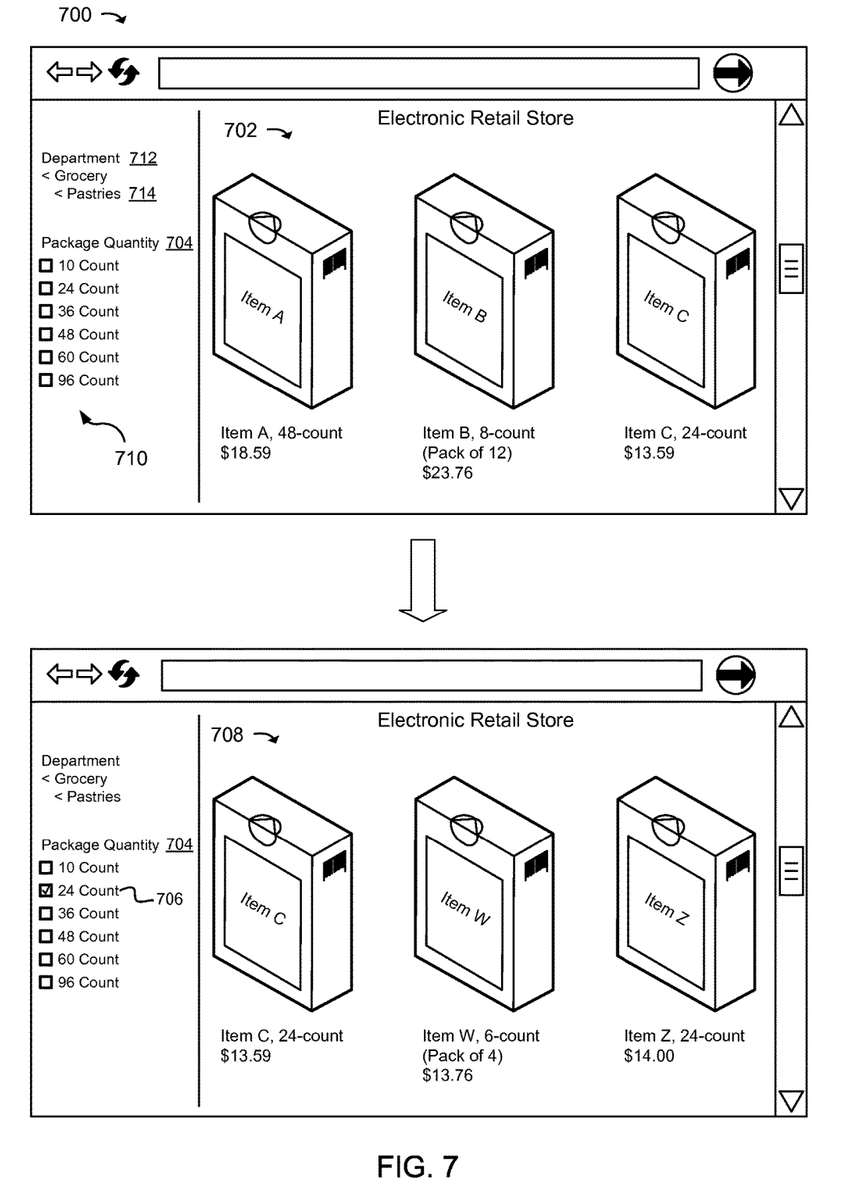
FIG. 7 is a diagram illustrating an example of an electronic retail store page displaying search results for an item search.

FIG. 7 is a diagram illustrating one example of an electronic retail store page 700 displaying search results 702 for an item search. The electronic retail page 700 may include a filter tool 704 that allows a customer to filter the search results 702 based on an item package quantity 710. The item package quantities 710 used to populate the filter tool may be obtained by referencing an inverted index containing item package quantities associated with item identification numbers used to identify an item. The inverted index may be constructed as disclosed above. A customer performing a search for an item may select an item package quantity 706 included in the filter tool 704, and items 708 having an item package quantity equal to the item package quantity selected may be displayed in the electronic retail store page 700.

As a specific example, a customer wishing to purchase an item may utilize the navigation tool 712 included in the electronic retail store page 700 to navigate to a classification node 714 that includes the item. Search results 702 that include a number of items having various item package quantities may then be displayed. The customer may then refine the item search to items having a specific item package quantity by selecting the item package quantity 706 included in the filter tool 704. Item identification numbers associated with the item package quantity 706 selected may be identified by referencing an inverted index, and items 708 associated with the item identification numbers may then be displayed to the customer. It will be noted that the example electronic retail page and item package quantity filter tool illustrated in FIG. 7 is merely representative and not limiting. Many other similar or different electronic retail pages that include an item package quantity filter tool are possible.

Figure 8:
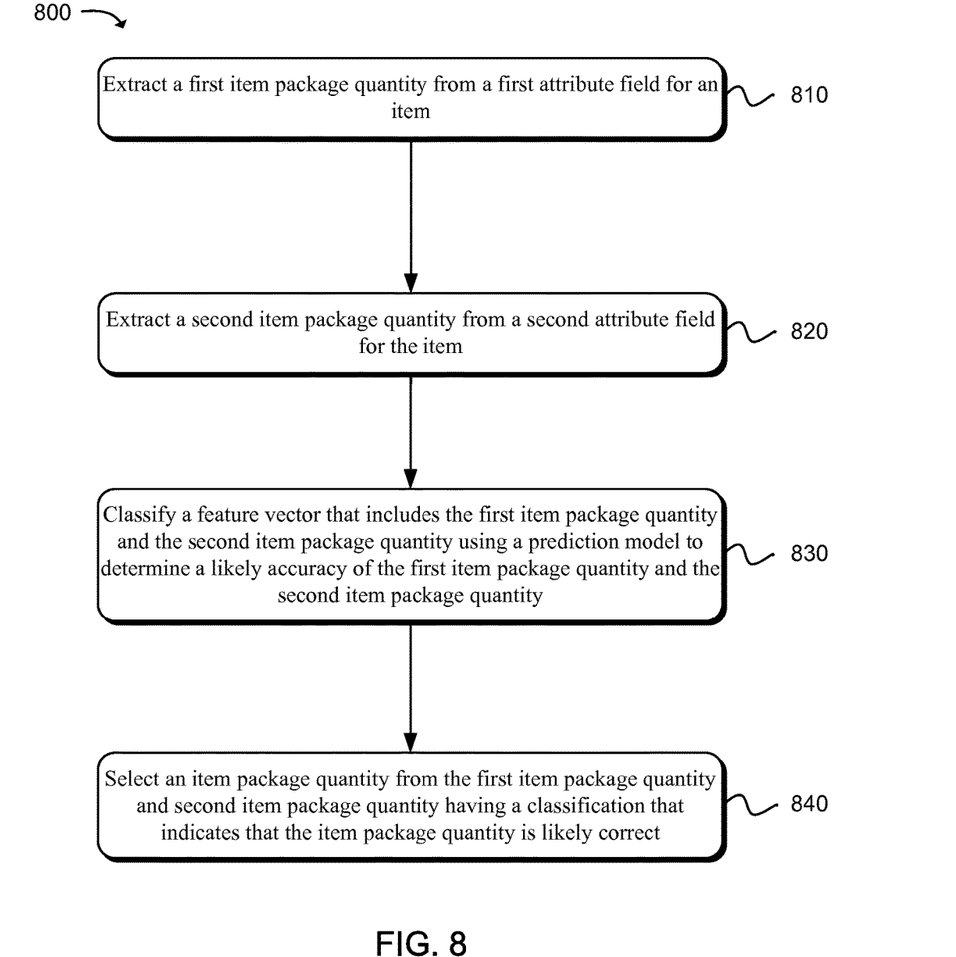
FIG. 8 is a flow diagram illustrating an example method for determining an item package quantity.

FIG. 8 is a flow diagram illustrating an example method 800 for determining an item package quantity. Beginning in block 810, a first item package quantity may be extracted from a first attribute field for an item. The first attribute field may be an attribute associated with the item that may contain information about a number of items that may be included in the item's package. As in block 820, a second item package quantity may be extracted from a second attribute field for the item. As with the first attribute field, the second attribute field may be an attribute associated with the item containing item package quantity information for the item. The item package quantities obtained from the first attribute field and the second attribute field may be extracted from unstructured text and, in one example configuration, the first item package quantity and the second item package quantity may be compared to determine whether the two item package quantities may be equal. Equality of the first item package quantity and the second item package quantity may be a good indicator that the item package quantities contained in the first attribute field and second attribute field are likely accurate.

In a case where the first item package quantity is not equal to the second item package quantity, then, as in block 830, classification of a feature vector that includes the first item package quantity and the second item package quantity may be performed using a prediction model that determines a likely accuracy of the first item package quantity and the second item package quantity. The feature vector may be constructed as described earlier. In one example configuration, a supervised machine leaning model may be used to classify the feature vector. The machine learning model may, in one example, classify the feature vector by providing an output that indicates whether an item package quantity contained in a particular attribute field is likely accurate, or that a correct item package quantity cannot be determined for the attribute field. As in block 840, an item package quantity may then be selected from the first item package quantity and second item package quantity having a classification that indicates that the item package quantity is likely accurate.

In one example configuration, the steps of determining a correctness of an item package quantity for an item may be performed for each item within a classification node. The item package quantities contained within the classification node may then be further refined by removing outlier item package quantities. In one example configuration, item package quantities within a classification node may be grouped together, thereby creating a package quantity set. The package quantity set may then be analyzed to determine whether there are any outlier item package quantities within the package quantity set, as described earlier in relation to FIG. 6. Any outlier item package quantities identified may then be removed from the package quantity set, and the item package quantities remaining in the package quantity set may be used to construct an index of item package quantities that references items associated with a particular item package quantity.

Figure 9:
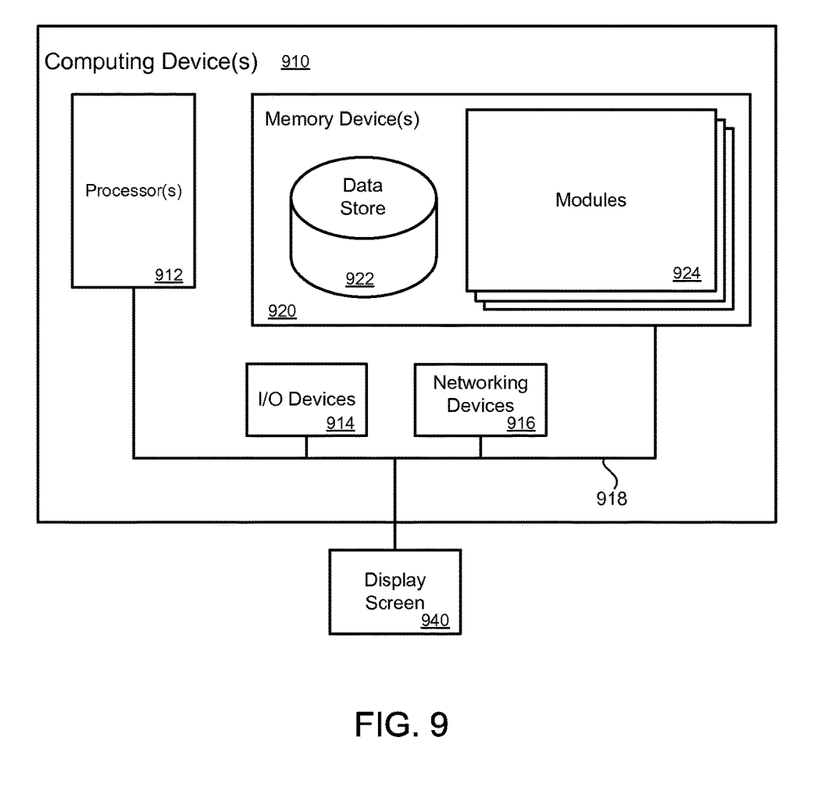
FIG. 9 is block diagram illustrating an example of a computing device that may be used to execute a method for determining an item package quantity.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules that are executable by the processor(s) 912. In one example, the memory device 920 may contain a quantity extraction module, prediction module, quantity refinement module, index module and other modules that may be located in the memory device 920. The modules 924 may execute the functions described earlier. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 940 that is available to display output from the computing devices. Other known I/O device may be used with the computing device as desired. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method for a filter tool provided in an electronic page, comprising:
    under control of one or more computer systems configured with executable instructions, loading the electronic page with the filter tool in a browser application;
    obtaining an index of item package quantities for items that correspond to an item search, the index of item package quantities having been constructed by:
        extracting item package quantities from attribute fields for an item;
        constructing a feature vector to include the attribute fields and the item package quantities;
        inputting the feature vector to a machine learning model trained to classify the feature vector to predicted labels representing a correctness of the item package quantities;
        selecting an item package quantity having a predicted label that indicates that the item package quantity is correct;
        grouping the item package quantities for multiple items within a classification node where the item package quantity is included in the grouping;
        removing item package quantities from the grouping that have been determined to be outliers within the grouping;
        adding the grouping to the index of item package quantities; and
    loading the index of item package quantities into the filter tool, wherein selecting an item package quantity included in the filter tool causes at least one item that corresponds to the item package quantity to be displayed in the electronic page.

2. A method as in claim 1, further comprising:
    creating a package quantity set from the grouping of item package quantities; and
    determining item package quantities that are outliers within the package quantity set.

3. A method as in claim 2, wherein determining item package quantities that are outliers further comprises:
    sorting the item package quantities within the package quantity set in decreasing order of a distance from a mean computed for the package quantity set;
    discarding item package quantities one by one from the package quantity set in the decreasing order, computing a smoothing factor of the package quantity set after discarding an item package quantity; and
    outputting a package quantity set having a smallest smoothing factor value as compared to other smoothing factor values for other package quantity sets.

4. A method as in claim 1, further comprising:
    grouping item package quantities within a classification node where the classification node represents a collection of items associated with a classification;
    creating a package quantity set from the grouping of item package quantities;
    identifying item package quantities associated with a small number of items within the classification node as compared to other item package quantity item associations; and
    removing the item package quantities identified from the package quantity set.

5. A method as in claim 1, wherein the machine learning model is a random forest model, a Bayesian network model, a neural network or a linear classifier model.

6. A method as in claim 1, wherein the attribute fields are associated with an item offered for purchase from an electronic retail store.

7. A non-transitory machine readable storage medium having instructions embodied thereon, the instructions when executed cause a processor to provide a filter tool in an electronic page, comprising:
    loading the electronic page with the filter tool;
    obtaining an index of item package quantities for items that correspond to an item search, the index of item package quantities having been constructed by:
        extracting item package quantities from attribute fields for an item, wherein the attribute fields include conflicting item package quantities and inter-item attribute agreements of the item package quantities;
        constructing a feature vector to include the attribute fields and the item package quantities;
        inputting the feature vector to a machine learning model trained to classify the feature vector to predicted labels representing a correctness of the item package quantities and indicating which of the attribute fields an item package quantity is to be derived; and selecting an item package quantity having a predicted label that indicates that the item package quantity is correct;

grouping item package quantities for multiple items within a classification node where the item package quantity is included in the grouping;

removing item package quantities from the grouping that have been determined to be outliers within the grouping;

adding the grouping to the index of item package quantities; and loading the index of item package quantities into the filter tool, wherein selecting an item package quantity included in the filter tool causes at least one item that corresponds to the item package quantity to be displayed in the electronic page.

8. The non-transitory machine readable storage medium as in claim 7, further comprising:

creating a package quantity set from the grouping of item package quantities; and determining item package quantities that are outliers within the package quantity set.

9. The non-transitory machine readable storage medium as in claim 8, wherein determining item package quantities that are outliers further comprises:

sorting the item package quantities within the package quantity set in decreasing order of a distance from a mean computed for the package quantity set;

discarding item package quantities one by one from the package quantity set in the decreasing order, computing a smoothing factor of the package quantity set after discarding an item package quantity; and outputting a package quantity set having a smallest smoothing factor value as compared to other smoothing factor values for other package quantity sets.

10. The non-transitory machine readable storage medium as in claim 8, wherein grouping the item package quantities within the classification node further comprises:

creating a package quantity set from the grouping of item package quantities;

identifying item package quantities associated with a small number of items within the classification node as compared to other item package quantity item associations; and removing the item package quantities identified from the package quantity set.

11. The non-transitory machine readable storage medium as in claim 7, wherein the index of item package quantities is an inverted index of item package quantities that index to associated items included in the classification node.

12. A system for providing a filter tool in an electronic page, comprising:

at least one processor; and a memory device including instructions that, when executed by the at least one processor, cause the system to:

load the electronic page with the filter tool;

obtain an index of item package quantities for items that correspond to an item search, wherein constructing the index of item package quantities includes instructions that:

extract item package quantities from attribute fields for an item, wherein the attribute fields include conflicting item package quantities and inter-item attribute agreements of the item package quantities;

construct a feature vector to include the attribute fields and the item package quantities;

input the feature vector to a machine learning model trained to classify the feature vector to predicted labels representing a correctness of the item package quantities;

select an item package quantity from the item package quantities having a predicted label that indicates that the item package quantity is correct;

group the item package quantities for multiple items within a classification node where the item package quantity is included in the group;

remove the item package quantities from the group that have been determined to be outliers within the group;

add the group to the index of item package quantities; and load the index of item package quantities into the filter tool, wherein selecting an item package quantity included in the filter tool causes at least one item that corresponds to the item package quantity to be displayed in the electronic page.

13. The system as in claim 12, wherein the machine learning model outputs a predicted label indicating which of the attribute fields the item package quantity is to be derived.

14. The system as in claim 12, wherein the machine learning model is a random forest model, a Bayesian network model, a neural network, or a linear classifier model.

* * * * *